Aug. 20, 1963  R. WATSON  3,101,087
CONTACT LENS CONTAINER
Filed July 14, 1960  2 Sheets-Sheet 1
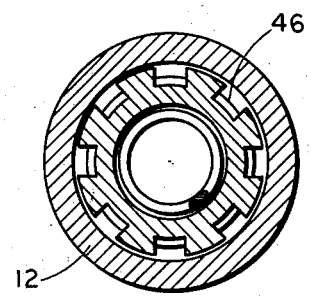
FIG. 4
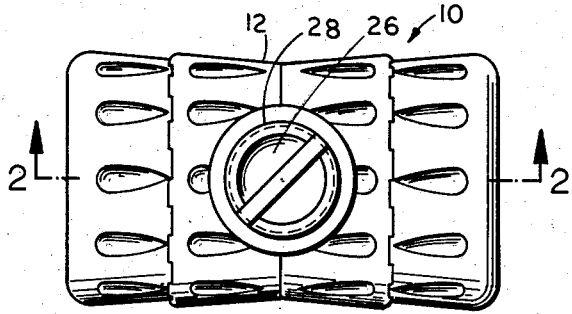
FIG. 1
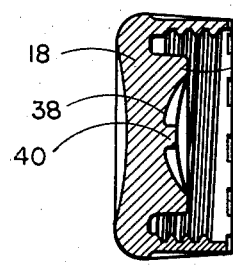
FIG. 3
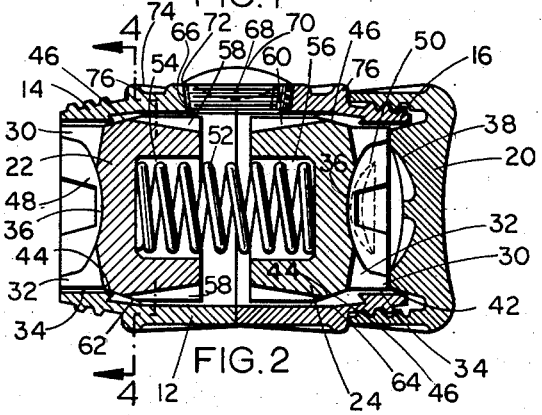
FIG. 2
FIG. 6  FIG. 7
FIG. 5
*INVENTOR.*
RICHARD WATSON
BY Aug. 20, 1963
R. WATSON
3,101,087
CONTACT LENS CONTAINER
Filed July 14, 1960
2 Sheets-Sheet 2
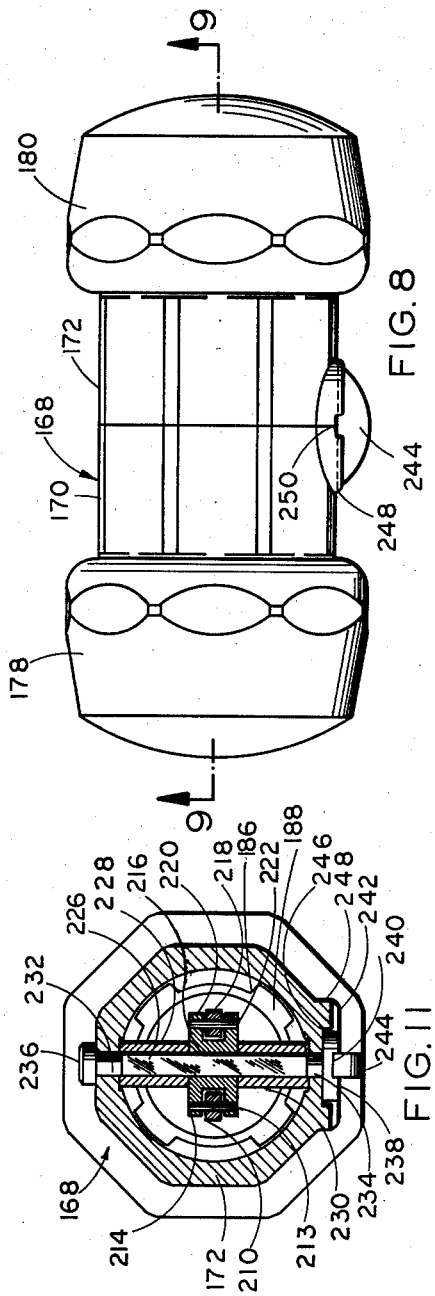
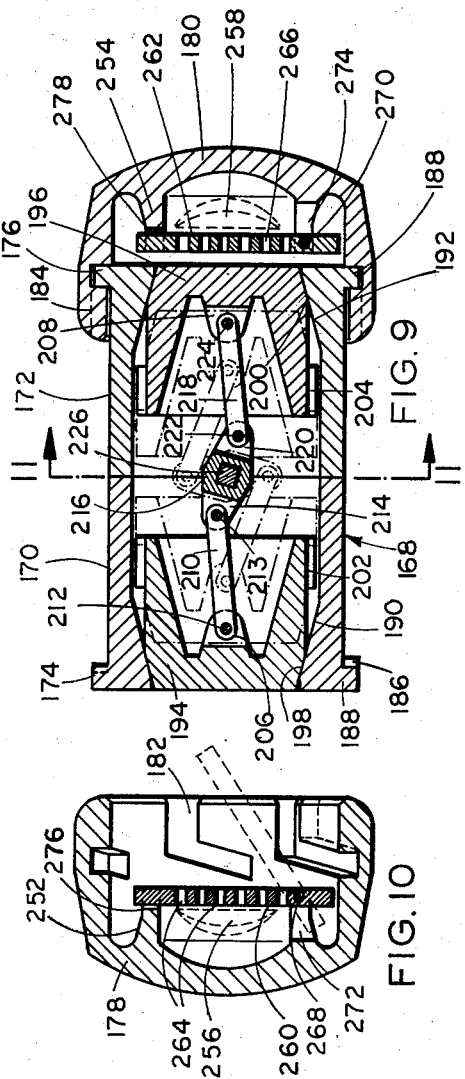
INVENTOR.
RICHARD WATSON

United States Patent Office 3,101,087
Patented Aug. 20, 1963

3,101,087
CONTACT LENS CONTAINER
Richard Watson, 522 S. 50th St., Omaha, Nebr.
Filed July 14, 1960, Ser. No. 42,807
4 Claims. (Cl. 134—143)

This invention relates to storage of contact lenses overnight or when not in use, and in particular a cylindrical body having caps threaded on the ends providing closures for contact lens compartments in the ends, and with valves actuated by the caps in the ends, whereby upon removing the caps to remove or replace a lens the valves in the ends of the body are closed to prevent loss of solution, and upon replacing the caps the valves are opened permitting the solution to flow into the compartments and around lenses therein.

The purpose of this invention is to provide a contact lens container in which lenses are retained in free positions in cradles and wherein the lenses are subjected to soaking solutions.

Various types of containers have been provided for holding contact lenses when the lenses are not in use. However, owing to the fact that it is not desirable to permit the lenses to dry, solution holding containers have been resorted to, and as the lenses are substantially invisible it is difficult to remove the lenses from containers having solutions therein. With these thoughts in mind this invention contemplates a barrel-like container having lens receiving compartments and valves in the ends with caps threaded on the ends, and in which the caps open the valves as they are threaded on the ends of the container and permit the valves to close as they are removed from the container.

The object of this invention is to provide a contact lens container from which lenses may readily be removed.

Another object of the invention is to provide a contact lens container from which lenses may be removed and replaced without marring the lenses.

Another important object of the invention is to provide a contact lens container in which the lenses are immersed in a solution, and in which the lenses may be removed and replaced without splashing the solution on the hands of the operator.

It is yet another object of the invention to provide a contact lens container in which lenses may be retained in a solution and in which it is impossible for the lenses to flip over.

A further object of the invention is to provide a lens holder in which lenses remain in cradles and from which the lenses are readily removed.

A further object is to provide a contact lens container in which the lens does not stick to the lid or cap.

A further object is to provide a contact lens container having a solution therein in which the solution drains back into the body of the container carrying the lens with it back to the cradle in the lens compartment.

Still another object is to provide a holder which can be filled or the solution changed through a side-plug without lens removal.

Yet another objective is to provide a lens container in which the lenses are immersed in solution at all times, regardless of the position of the container.

A further objective is to provide a lens container in which a valve, when lowered into the body of the container by screwing on a cap, displaces soaking solution whereby the lens chambers are filled sufficiently to keep the lenses immersed in solution at all times, regardless of the position of the container.

A still further object is to provide a contact lens container that is provided with a relatively large soaking solution capacity.

And a still further object is to provide a contact lens container in which covers thereof are not accidentally displaced, a soaking solution thereof is not wasted, and in which the soaking solution does not leak as lids or caps thereof are removed and replaced in which the container is of a simple and economical construction.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claims.

In the drawings:

FIGURE 1 is a plan view of the improved contact lens container.

FIGURE 2 is a longitudinal section through the container taken on line 2—2 of FIGURE 1, with a closure or cap at one end of the container omitted.

FIGURE 3 is a longitudinal section through one of the caps of the container, the cap being separated from the container.

FIGURE 4 is a cross section through the contact lens container taken on line 4—4 of FIGURE 2.

FIGURE 5 is a side elevational view of a contact lens container, similar to that shown in FIGURE 1, showing a modification wherein the peripheral surface is provided with spaced annular grooves.

FIGURE 6 is a longitudinal section through a contact lens container taken on line 6—6 of FIGURE 5, with a cap at one end omitted, and showing a further modification wherein the valve elements are carried by fingers of rubber or other resilient material.

FIGURE 7 is a longitudinal section through a cap at one end of the container shown in FIGURES 5 and 6, showing a further modification wherein a filling plug is threaded in one of the caps at one of the ends of the container.

FIGURE 8 is a side elevational view of a contact lens container of a different design illustrating a further modification wherein the cylindrical body is provided with flat sides.

FIGURE 9 is a longitudinal section through the container taken on line 9—9 of FIGURE 8, showing the modification of FIGURE 8 with the closure member at one end of the body omitted.

FIGURE 10 is a longitudinal section through a cap at one end of the container shown in FIGURES 8 and 9.

FIGURE 11 is a cross section through the contact lens container taken on line 11—11 of FIGURE 9, showing a manually actuated square shaft for opening and closing the valve elements.

While one embodiment of the invention is illustrated in the above-referred-to drawings, it is to be understood that they are merely for the purpose of illustration and that the various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the primary field of utility of the invention it remains obvious that it may be employed in any other capacity wherein it may be found applicable.

In the accompanying drawings, and in the following specification, the same reference characters are used to designate the same parts and elements throughout, and in which the numeral 10 refers to the invention in its entirety, numeral 12 indicating a cylindrical body having externally threaded nipples 14 and 16 on the ends, numerals 18 and 20 caps threaded on the nipples, numerals 22 and 24 valve elements positioned in the body, and numeral 26 a filling plug threaded in an opening 28 in the body, or positioned in one of the caps, as shown in FIGURE 7.

In the design illustrated in FIGURES 1, 2, 3 and 4 the valve elements are provided with annular rims 30 in which radially disposed slots 32 are positioned, and the material between the slots forms ribs 34 which coact with a recess 36 to provide a lens holding cradle. The inner faces of the caps are provided with arcuate recesses 38 having spacing ribs 40 therein, and rims 42 which are positioned to contact the rims 30 of the valve elements. The valve elements are formed with beveled surfaces 44 that are positioned to engage the valve seats 46 to close the respective ends of the body when the caps are removed. With the caps threaded on the nipples at the ends of the body the rims 42 force the valve elements away from the valve seats whereby solution in the body 12 passes into compartments 48 and 50 in which the lens retaining cradles are positioned. In the design illustrated in FIGURE 2 the valve elements are urged outwardly by a spring 52 the ends of which are positioned in recesses 54 and 56 in the valve elements 22 and 24, respectively.

The peripheral surfaces of the valve elements are provided with longitudinally disposed grooves 58 and 60, and the inner surface of the cylindrical body is provided with similar grooves 62 and 64 whereby vents are provided so that air trapped in the container may escape through the threads of the caps and nipples of the body as the caps are applied.

The cylindrical body is provided with a tapering filling opening 66 in which a plug 68 having a web or handle 70 thereon is threaded. The body is provided with a boss 72 in which the opening 66 is positioned, and an annular recess 74 with an outer wall 76 is provided around the recess. Overflow of the solution in filling the container will be caught in the recess 74.

It will be seen that each outer wall 76 can be called an annular shoulder and that they are adapted to be engaged by the inner ends of caps 18 and 20 in order to form a sealing relationship when the caps are in a closed position, as best seen in FIGURE 2.

In the design shown in FIGURE 7 a cap 78 similar to the caps 18 and 20 is provided with a filling opening 80 having a tapering thread 82 in the outer end, and a plug 84 having a web or handle 86 on the outer end is threaded in the opening. By this means solution in the container may be replenished through one of the caps.

In the design illustrated in FIGURES 5 and 6 the outer surfaces of sections 88 and 90 of the cylindrical body are provided with annular grooves 92 and 94, and caps 96 and 78 positioned on the ends of the body are provided with similar grooves 98 and 100. The inner ends of the sections 88 and 90 of the cylindrical body shown in FIGURES 5 and 6 are provided with annular recesses 102 and 104, and bases or valve rings 106 and 108 are nested in the annular recesses. A valve element 110 connected to the ring 106 by resilient fingers 112 is provided with a concave recess 114 in which contact lenses, as indicated by the dotted lines 116 may be positioned, and a similar valve element 118, positioned in the section 90 of the body and connected to the ring 108 by spring fingers 120 is provided with a concave recess 122.

The ends of the sections 88 and 90 of the cylindrical body shown in FIGURES 5 and 6, are provided with sleeves 124 and 126 of reduced diameters, and the sleeves are provided with beveled outer surfaces 128 and 130 that lead to annular grooves 132 and 134, whereby beads 136 and 138 forced over the beveled surfaces 128 and 130 snap into the grooves of the sections of the body retaining the caps on the body. The inner surfaces of the sleeves 124 and 126 are provided with annular ribs 140 and 142 that are positioned to engage outer surfaces of the valve elements to seal the ends of the container when the caps are removed.

The inner faces of the caps 96 and 78 are provided with rims 144 and 146, having radially positioned notches 148 and 150 therein, and the rims are positioned to contact outer faces of the valve elements 110 and 118 whereby, as illustrated in FIGURE 6, the valve element 110 is depressed, bending the spring fingers 112 outwardly, as the cap 98 is forced into sealing position on the section 88 of the cylindrical body. By the same means the valve element is released, as shown on the opposite side of FIGURE 6 when the cap is removed. The inner faces of the caps 96 and 78 are provided with concave recesses 152 and 154 and the recesses are provided with notches 156 forming ribs 158 that retain contact lenses in free positions in the ends of the container.

The caps 96 and 78 are also provided with tapering shoulders 160 and 162 and the shoulders are positioned to receive annular tips 164 and 166 on the ends of the sleeves 124 and 126. The tips and shoulders provide sealing means in the ends of the container so that a solution in the container may contact contact lenses in the cradle holding elements.

In the design illustrated in FIGURES 8, 9, 10 and 11 a cylindrical body 168, including sections 170 and 172 is provided with flanges 174 and 176 at the outer ends of the sections, and caps 178 and 180 having bayonet slots 182 and 184 therein are positioned over the flanges. The flanges are provided with notches 186 that provide lugs 188 that are positioned to pass into the bayonet slots for locking the caps on the ends of the cylindrical body. In this design the outer ends of the sections of the cylindrical body are provided with frustro-conical-shaped portions 190 and 192 and valve elements 194 and 196 positioned in the body are provided with corresponding tapering surfaces 198 and 200. The inner ends of the valve elements are retained in spaced relation to the inner wall surface of the body by lugs 202 and 204.

The valve elements 194 and 196 are provided with spaced tangs 206 in the valve element 194, and 208 in the element 196, and the tangs 206 are pivotally connected to a link 210 by a bolt 212. The opposite end of the link 210 is pivotally connected by a bolt 213 to tangs 214 extended from one side of a hub 216, and a similar link 218 is pivotally connected at one end to tangs 220 extended from the opposite side of the hub 216 by a bolt 222 and at the opposite end to the tangs 208 by a bolt 224.

The hub 216 is positioned on a shaft 226 which is held in the center of the body by spacing sleeves 228 and 230 and the shaft is provided with round sections 232 and 234 by which it is rotatably mounted in the cylindrical body 168. One end of the square shaft is provided with a head 236 and the opposite end is provided with a disc 238 having crossed slots 240 and 242 therein, and the disc is provided with a key 244 by which the shaft is rotated to actuate the valve elements. The disc 238 is positioned in a counter-bore 246 in a boss 248 on the side of the cylindrical body. The fact of the boss is provided with slots 250 for receiving the key 244.

The inner surfaces of the caps 178 and 180 are provided with annular ribs 252 and 254 which provide recesses 256 and 258 for holding contact lenses, and the recesses are provided with closures 260 and 262 having openings 264 and 266 therethrough. The closures, which provide gates or doors for the recesses 256 and 258 are pivotally mounted by pins 268 and 270 in openings 272 and 274 in the annular ribs 252 and 254, and the opposite sides of the closures are positioned in notches 276 and 278 in the ribs.

Operation

With the parts assembled as illustrated and described a cap at one end of the cylindrical body is removed whereby the valve element is forced outwardly sealing that end of the body and preventing escape of the solution in the body, so that contact lenses may be placed in the lens compartments at the ends of the body. With a lens positioned in a compartment the cap is replaced, pushing the valve element inwardly, and opening the lens compartment to the interior of the body so that a solution in the body may wash or surround a lens in the compartment.

It is desirable that the lenses lie immersed in the solution completely. This invention provides for continuous, complete immersion of the lenses.

When the ends of the container instantly closed as soon as caps are removed therefrom all possibility of wasting the solution or splashing the solution on the hands of the operator is substantially eliminated.

The container may be formed in different patterns or designs and different arrangements may be used for actuating the valves.

From the foregoing description, it is thought to be obvious that a fluid container to provide storage for contact lenses constructed in accordance with my invention is particularly well adapted for use, by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

Having now described the invention, that which is claimed to be new and desired to be procured by Letters Patent is:

1. An contact lens container comprising a hollow body, said body having opposite annular ends opening upon the interior of said body, two valves disposed in said body in positions for sealing said annular end portions of said body and movable to open positions for permitting liquid from the interior of said body to flow past said valves out into said annular ends of said body to be received by contact lenses in said annular ends of said body, caps removably attached to the opposite ends of said body for closing said ends, the shape of the interior of each cap and the shape of the adjacent surface of the respective adjacent valves being such as to receive a contact lens therebetween, and means for urging said valves into closed positions to block liquid from the interior of said body from passing to the said annular end portions, said body having means on the interior thereof for cooperating with said valves to make possible said blocking at times when said valves are in said closed positions, so that a contact lens may be placed in that respective end without fluid leakage from that end, and means operable from the exterior of said body for causing each valve to be moved to an open position at such time as the respective cap has been at least partially placed on the respective end of said body.

2. The combination of claim 1 which further comprises a filling opening through said body and a filling plug removably attached to said body for plugging said filling opening.

3. The combination of claim 1 in which said means for moving each valve into an open position comprises the inner wall of each cap being provided with a shape such that each cap is adapted to engage an outer side of the respective valve to cause the respective valve to move inwardly and to an open position as the respective cap is placed on the respective end of said container.

4. The combination of claim 1 in which said caps and the exterior of said body are threaded for the securing of said caps on said body, and in which said body and said valves are shaped for permitting air in the interior of said body to pass by said valves at all times, and in which said body portion has annular shoulders disposed inwardly from the respective ends thereof from the respective threaded portions thereof, and in which said caps have annular innermost ends which are adapted to abut said shoulders in a sealing relationship when said caps are in closed positions, and said threads of said caps and body being so constructed that they permit air to escape therebetween during a closing of said caps whereby sealing is achieved primarily by the annular inner ends of said caps rather than by said threads.

References Cited in the file of this patent
UNITED STATES PATENTS

| | | |
|---|---|---|
| 647,182 | Garand | Apr. 10, 1900 |
| 1,023,630 | Elkins | Apr. 16, 1912 |
| 1,290,583 | Kruecke | Jan. 7, 1919 |
| 1,351,008 | Simpson | Aug. 24, 1920 |
| 1,532,253 | Meredith | Apr. 7, 1925 |
| 1,650,829 | Grant | Nov. 29, 1927 |
| 2,877,779 | Bromberg | Mar. 17, 1959 |